(12) United States Patent
Wright et al.

(10) Patent No.: US 9,928,101 B2
(45) Date of Patent: *Mar. 27, 2018

(54) CERTIFICATE BASED CONNECTION TO CLOUD VIRTUAL MACHINE

(71) Applicant: MICROSOFT TECHNOLOGY LICENSING, LLC, Redmond, WA (US)

(72) Inventors: Eron D. Wright, Sammamish, CA (US); Muhammad Umer Azad, Bellevue, WA (US); Sushant P. Rewaskar, Redmond, WA (US); Corey M. Sanders, Seattle, WA (US); Saad Syed, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/887,193

(22) Filed: Oct. 19, 2015

(65) Prior Publication Data

US 2016/0041839 A1    Feb. 11, 2016

Related U.S. Application Data

(63) Continuation of application No. 13/462,223, filed on May 2, 2012, now Pat. No. 9,210,162.

(51) Int. Cl.
*G06F 9/455* (2006.01)
*G06F 21/00* (2013.01)
(Continued)

(52) U.S. Cl.
CPC ........ *G06F 9/45558* (2013.01); *G06F 9/4416* (2013.01); *H04L 63/0823* (2013.01);
(Continued)

(58) Field of Classification Search
CPC ............. H04L 63/1416; H04L 63/1408; H04L 63/1441; H04L 63/1458; G06F 21/552;
(Continued)

(56) References Cited

U.S. PATENT DOCUMENTS 8,028,329 B2  9/2011 Whitcomb
8,117,314 B2  2/2012 Croft et al.
(Continued)

FOREIGN PATENT DOCUMENTS

CN    102035849 A    4/2011
EP     2278514 A1    1/2011
(Continued)

OTHER PUBLICATIONS

"Final Office Action Issued in U.S. Appl. No. 13/462,223", dated Feb. 27, 2014, 16 Pages.
(Continued)

*Primary Examiner* — Alexander Lagor
(74) *Attorney, Agent, or Firm* — Workman Nydegger

(57) ABSTRACT

In an environment that includes a host computing system that executes virtual machines, and a secure cloud computing channel that communicatively couples the host to a client computing system that is assigned to a particular one of the virtual machines, the particular virtual machine generates a certificate, install the certificate on the itself, and returns a certificate representation to the client. This may occur when the virtual machine is provisioned. During a subsequent connection request from the client to the virtual machine, the virtual machine returns the certificate to the client. The client compares the certificate representation that was returned during provisioning with the certificate returned during the subsequent connection, and if there is a match, then the virtual machine is authenticated to the client. Thus, in this case, the virtual machine authenticates without (Continued)

the client having to generate, install, and manage security for a certificate.

20 Claims, 6 Drawing Sheets

(51) Int. Cl.
  *G06F 21/57* (2013.01)
  *H04L 29/06* (2006.01)
  *G06F 9/44* (2018.01)

(52) U.S. Cl.
  CPC .............. *H04L 63/0869* (2013.01); *G06F 2009/45591* (2013.01); *G06F 2009/45595* (2013.01)

(58) Field of Classification Search
  CPC ............ G06F 9/45558; G06F 9/45533; G06F 21/575; G06F 2009/45587; G06F 21/53; G06F 21/57; G06F 2009/4557; G06F 9/455
  USPC ................ 713/155–159, 160–167, 189–193; 380/28–30, 44–47, 277–286; 709/229
  See application file for complete search history.

(56) References Cited

U.S. PATENT DOCUMENTS

| | | |
|---|---|---|
| 2002/0116485 A1 | 8/2002 | Black et al. |
| 2007/0204166 A1* | 8/2007 | Tome ................. H04L 63/0272 713/182 |
| 2008/0091618 A1 | 4/2008 | Obrea et al. |
| 2008/0148390 A1 | 6/2008 | Zimmer et al. |
| 2009/0025080 A1 | 1/2009 | Lund et al. |
| 2010/0132017 A1 | 5/2010 | Robinson et al. |
| 2011/0246765 A1 | 10/2011 | Schibuk |
| 2011/0314155 A1* | 12/2011 | Narayanaswamy .. G06F 9/4856 709/226 |
| 2012/0265976 A1* | 10/2012 | Spiers ................ H04L 63/0218 713/2 |
| 2012/0266252 A1 | 10/2012 | Spiers et al. |
| 2013/0227710 A1 | 8/2013 | Barak et al. |
| 2013/0290712 A1 | 10/2013 | Zaverucha et al. |

FOREIGN PATENT DOCUMENTS

| | | |
|---|---|---|
| WO | 2011006997 A1 | 1/2011 |
| WO | 2012110903 A1 | 8/2012 |

OTHER PUBLICATIONS

"Final Office Action Issued in U.S. Appl. No. 13/462,223", dated Jan. 26, 2015, 11 Pages.
"Non-Final Office Action Issued in U.S. Appl. No. 13/462,223", dated Nov. 6, 2013, 10 Pages.
"Non-Final Office Action Issued in U.S. Appl. No. 13/462,223", dated Jul. 3, 2014, 12 Pages.
"Notice of Allowance Issued in U.S. Appl. No. 13/462,223", dated Jul. 28, 2015, 16 Pages.
"International Search Report & Written Opinion Issued in PCT Application No. PCT/US2013/038555", dated Jul. 8, 2013, 8 Pages.
Shrivastava, Anshu "Out-of-Band Management: Devolutions Unveils Remote Desktop Manager Server", Retrieved From <<http://web.archive.org/web/20130523185031/http://out-of-band-management.tmcnet.com/articles/258572-out-of-band-management-devolutions-unveils-remote-desktop.htm>>, Jan. 23, 2012, 2 Pages.
Supplemental European Search Report issued in Application No. 13722908.4, dated Jan. 25, 2017.
"First Office Action and Search Report Issued in Chinese Patent Application No. 201380022850.5", dated Sep. 20, 2016, 12 Pages.
"Second Office Action Issued in Chinese Patent Application No. 201380022850.5", dated Jun. 5, 2017, 5 Pages.

* cited by examiner

CERTIFICATE BASED CONNECTION TO CLOUD VIRTUAL MACHINE

CROSS-REFERENCE TO RELATED APPLICATIONS

This application is a continuation of U.S. patent application Ser. No. 13/462,223 filed on May 2, 2012, entitled "CERTIFICATE BASED CONNECTION TO CLOUD VIRTUAL MACHINE," which issued as U.S. Pat. No. 9,210,162 on Dec. 8, 2015, and which application is expressly incorporated herein by reference in its entirety.

BACKGROUND

The virtualization of computing systems has enabled the flexible and convenient setup and maintenance of computing systems. A computing system is virtualized by having a virtual machine operate remotely from the client computing system that the virtual machine serves. The virtual machine emulates the logic of a fully operational computing system including the operating system, its various applications, and corresponding settings, and interfaces with the user via a remotely located client computing system. For instance, the virtual machine receives client input from the remote client, and provides resulting desktop image information back to the client. The client does not operate the corresponding operating system, but rather just receives the user input, relays such user input to the virtual machine, and renders the desktop using the resulting desktop image provided by the virtual machine.

Virtual machines have more recently be implemented in cloud computing environments. "Cloud computing" is a model for enabling ubiquitous, convenient, on-demand network access to a shared pool of configurable computing resources (e.g., networks, servers, storage, applications, and services). The shared pool of configurable computing resources can be rapidly provisioned via virtualization and released with low management effort or service provider interaction, and then scaled accordingly. A cloud computing model can be composed of various characteristics (e.g., on-demand self-service, broad network access, resource pooling, rapid elasticity, measured service, etc), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

BRIEF SUMMARY

At least one embodiment described herein relate to a system in which a host computing system executes virtual machines, and a cloud computing channel that communicatively couples the host to a client computing system that is assigned to one of the virtual machines. In some embodiments, the cloud computing channel exists to provide end to end security between the client computing system and the host computing system. Using the principles described herein, such end to end security can be extended from the client computing system all the way to the corresponding virtual machine running on behalf of the client.

The virtual machine is configured to generate a certificate, install the certificate on the virtual machine, and return a certificate representation to the client. For instance, this may occur when the virtual machine is provisioned. During a subsequent connection request from the client to the virtual machine, the virtual machine returns the certificate to the client. The client compares the certificate representation that was returned during provisioning with the certificate returned during the subsequent connection, and if there is a match, then the virtual machine is authenticated to the client. Thus, in this case, the virtual machine authenticates without the client having to generate and install a certificate, simplifying the process for the client.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a client computing system authenticates a virtual machine to which it is assigned without having to generate and install a certificate. First, some introductory discussion regarding computing systems will be described with respect to FIG. 1. Then, embodiments of the authentication will be described with respect to FIGS. 2 through 6.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
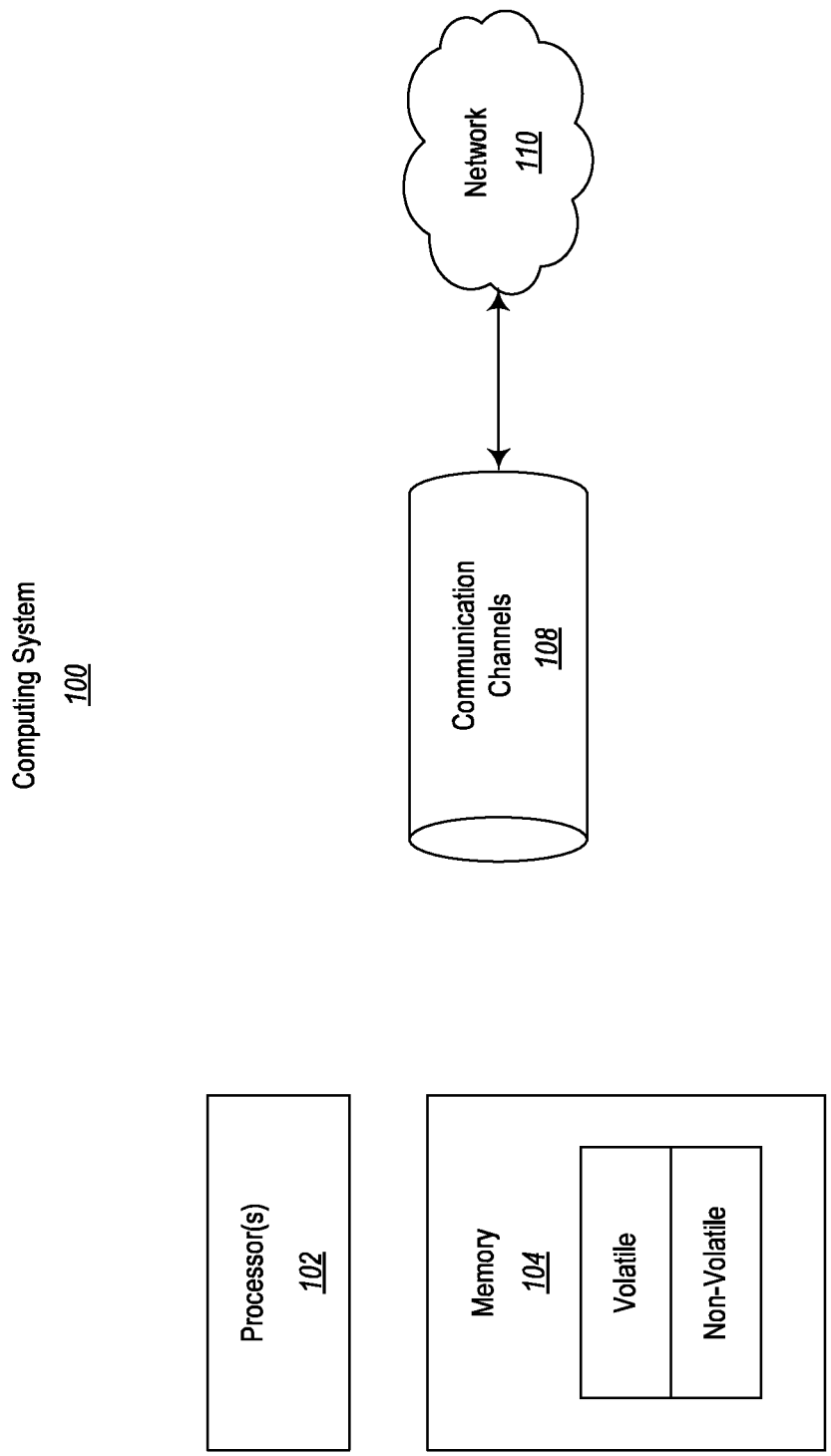
FIG. 1 illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 2:
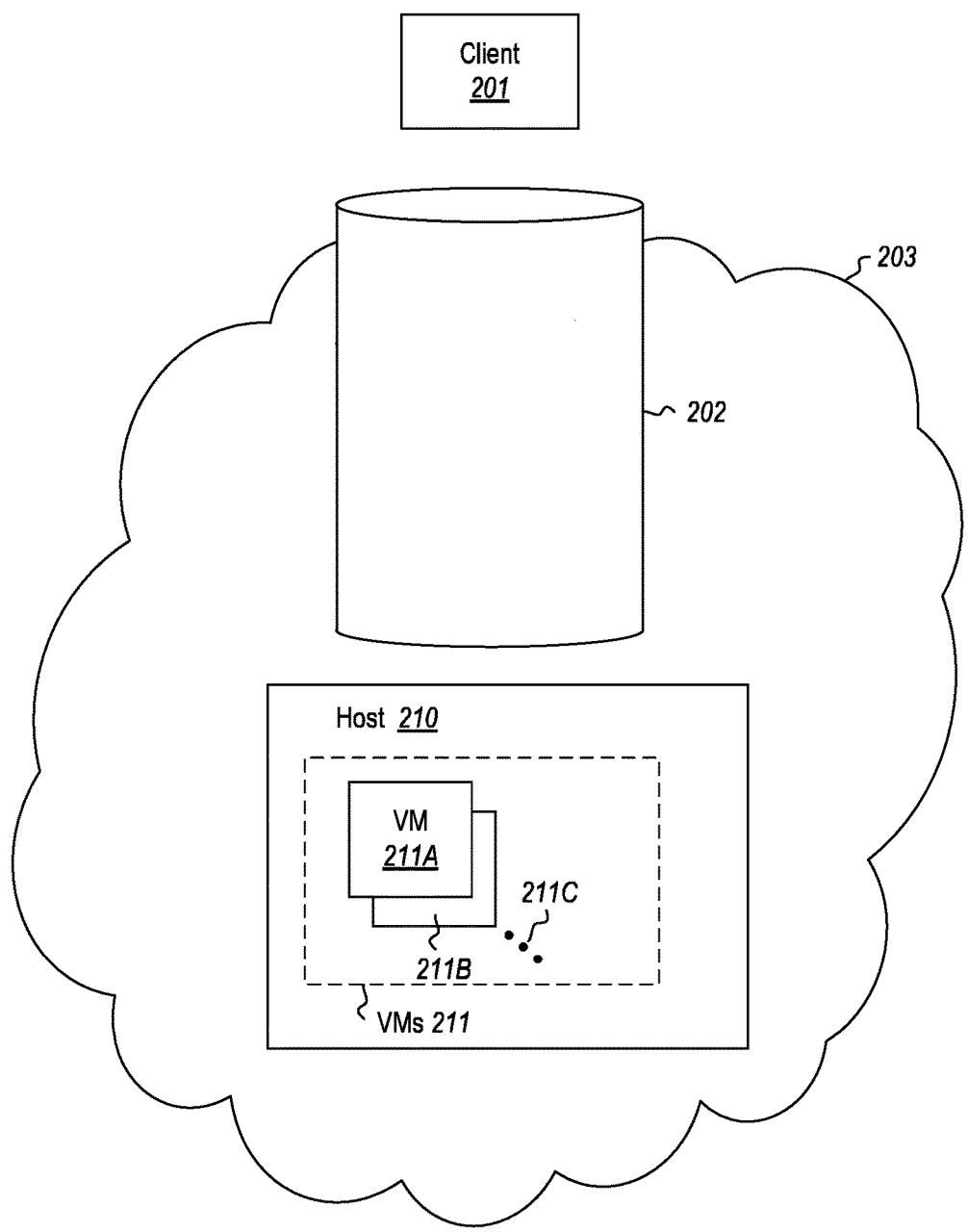
FIG. 2 illustrates a system which is an operating environment in which a client computing system provisions and connects to a virtual machine that is hosted by a host computing system within a cloud computing environment, so that the client may subsequently operate the virtual machine.

FIG. 2 illustrates a system 200 which is an operating environment in which a client computing system 201 provisions and connects to a virtual machine (e.g., virtual machine 211A) that is hosted by a host computing system 210 within a cloud computing environment 203, so that the client 201 may subsequently operate the virtual machine 211A. The client computing system 201 may be structured as described above for the computing system 100 of FIG. 1, and will also hereinafter be referred to simply as "client 201". The host computing system 210 may also be structured as described above for the computing system 100 of FIG. 1, and will also hereinafter be referred to simply as "host 210". While the principles described herein relate primarily to the pre-operation procedures of provisioning and initial connection, a brief note about operation of the virtual machine will now be described.

During operation, the virtual machine 211A emulates a fully operational computing system including an at least an operating system, and perhaps one or more other applications as well. The virtual machine generates a desktop image or other rendering instructions that represent a current state of the desktop, and then transmits the image or instructions to the client for rendering of the desktop. As the user interacts with the desktop, the user inputs are transmitted to the virtual machine. The virtual machine processes the user inputs and, if appropriate, changes the desktop state. If such change in desktop state is to cause a change in the rendered desktop, then the virtual machine alters the image or rendering instructions, if appropriate, and transmits the altered image or rendered instructions to the client computing system for appropriate rendering. From the perspective of the user, it is as though the client computing system is itself performing the desktop processing.

As previously mentioned, the host 210 operates in a cloud computing environment. In this description and the following claims, "cloud computing" is defined as a model for enabling ubiquitous, convenient, on-demand network access to a shared pool of configurable computing resources (e.g., networks, servers, storage, applications, and services). The shared pool of configurable computing resources can be rapidly provisioned via virtualization and released with low management effort or service provider interaction, and then scaled accordingly. A cloud computing model can be composed of various characteristics (e.g., on-demand self-service, broad network access, resource pooling, rapid elasticity, measured service, etc), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). In this description and in the claims, a "cloud computing environment" is an environment in which cloud computing is employed.

The host 210 is capable of hosting a number of virtual machines 211, and is typically a single physical machine with processing, memory, storage, and networking resources. In the illustrated example, the host 210 executes virtual machines 211A and 211B, although the ellipses 211C represent that the principles described herein are not limited to the number of virtual machines executed on the host.

The system 200 also includes a cloud computing channel 202 communicatively coupling the host 210 to the client 201. The cloud computing channel 202 has the characteristics of 1) being able to connect to an entity such as the client 201 outside of the cloud computing environment 203, 2) is accessible to the host 210, and 3) provides some level of identity security regarding identities of parties directly connected to each end of the cloud computing channel 202. Thus, by the very act of being able to communicate directly over the cloud computing channel 202, the client 201 can authenticate the host 210, and the host 210 can authenticate the client 201. However, without further processing, the client 201 has not yet authenticated the virtual machine 211A, and the virtual machine 211A has not yet authenticated the client 201.

Figure 3:
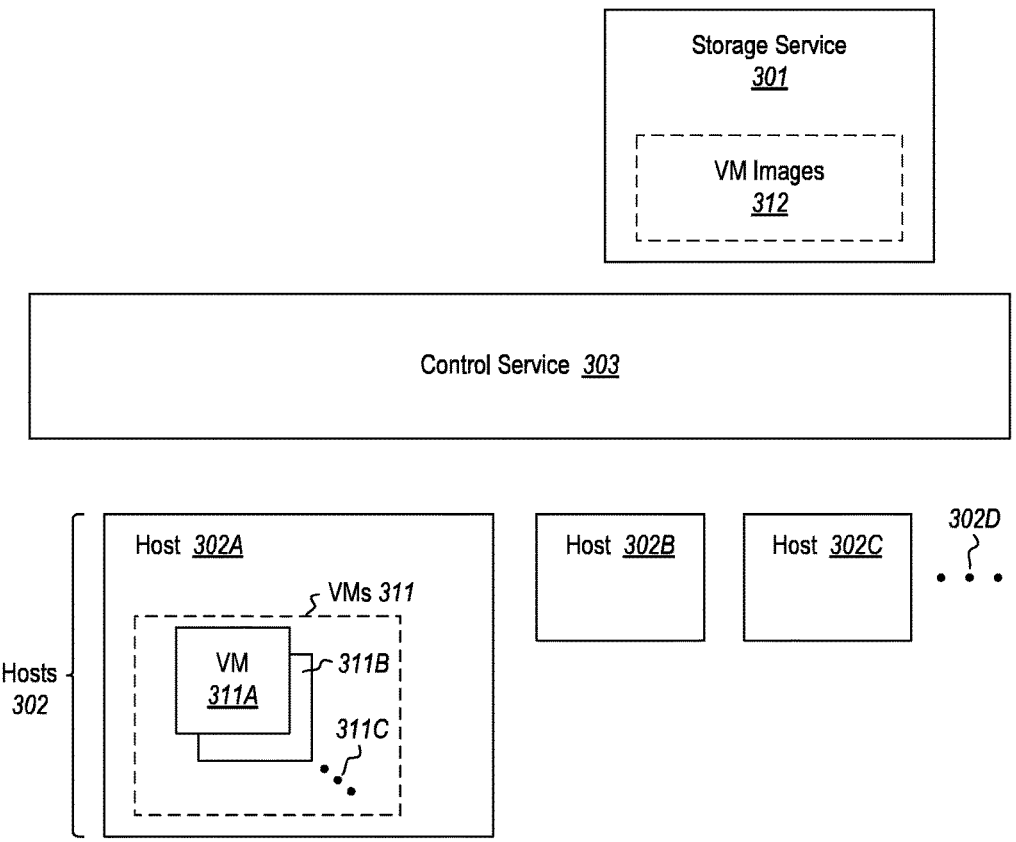
FIG. 3 illustrates an example of a cloud computing environment 200 and represents an example of the cloud computing environment of FIG. 2.

FIG. 3 illustrates an example of the cloud computing environment 300. In this example, the host computing system 302A is an example of the host 210 of FIG. 2, and is just one of a number of hosts 302 within the cloud computing environment 300. For instance, although three hosts 302A, 302B, and 302C are illustrated, the ellipses 302D represent that there may be any number of hosts within the cloud computing environment 300.

The virtual machines 311 are examples of the virtual machines 211 of FIG. 2. Virtual machines are instantiated within this cloud computing environment from virtual machine images 312 that are contained within a storage service 301. A control service 303 coordinates the various services within the cloud computing environment 300 including providing a secure cloud computing channel between the hosts (such as host 302A) and the clients (such as client 201) that are assigned to the various virtual machines (such as virtual machine 311A) within the hosts.

Figure 4:
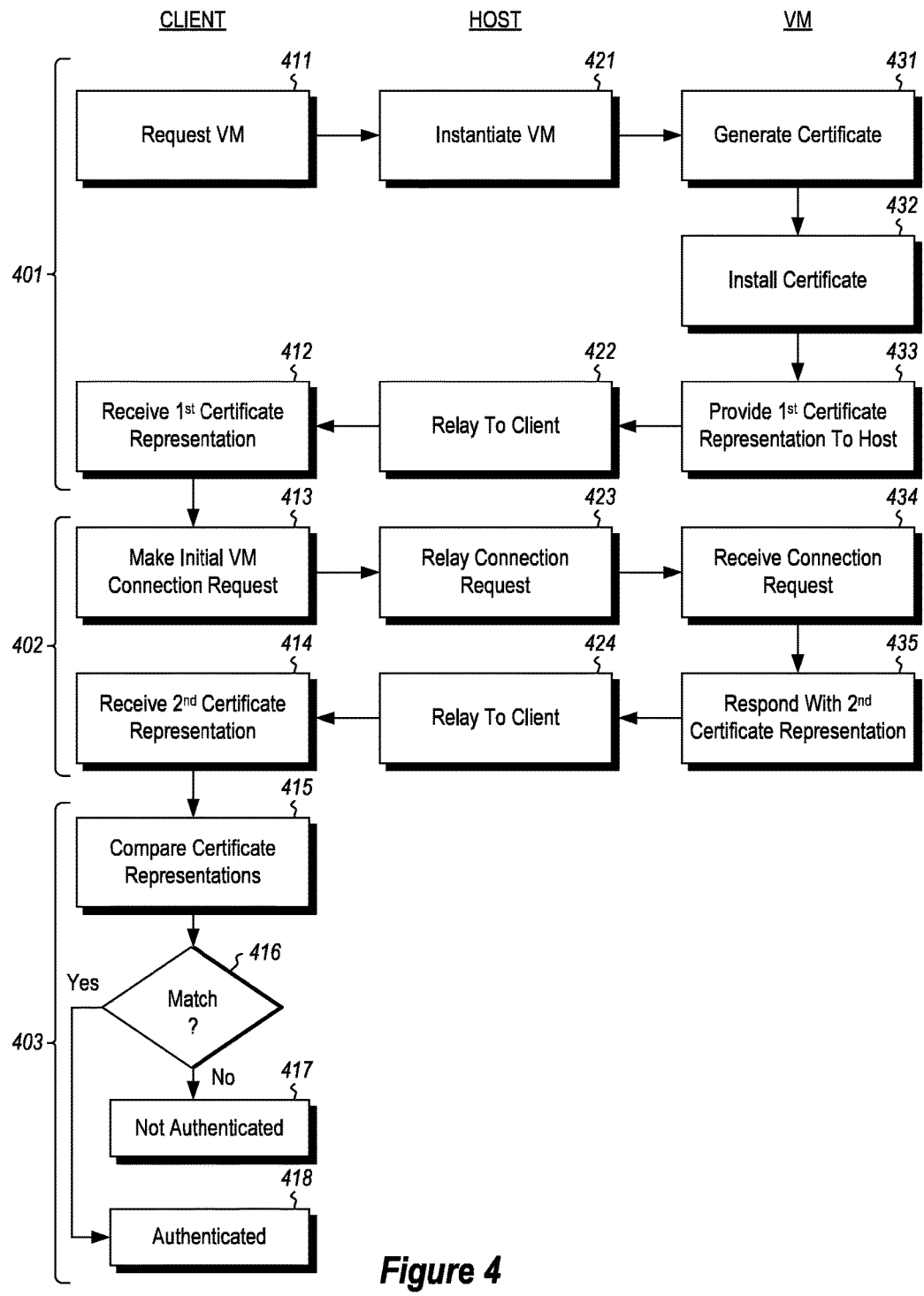
FIG. 4 illustrates a flowchart of a method for a client computing system to connect to a virtual machine.

FIG. 4 illustrates a flowchart of a method 400 for a client computing system to connect to a virtual machine. In one embodiment, that client computing system is the client 201 of FIG. 1, and the virtual machine is the virtual machine 211A of FIG. 2. Accordingly, since the method 400 may be performed in the context of the system 200 of FIG. 2, the method 400 of FIG. 4 will now be described with frequent reference to the system 200 of FIG. 2.

In FIG. 4, some of the illustrated acts are performed by the client (e.g., client 201) as represented in the left column of FIG. 4 under the heading "CLIENT". Others of the illustrated acts are performed by the virtual machine (e.g., virtual machine 211A) as represented in the right column of FIG. 4 under the heading "VM". Others of the illustrated acts are performed by the host (e.g., host 210) as represented in the middle column of FIG. 4 under the heading "HOST". The method 400 includes a first round trip communication phase 401 in which the virtual machine is provisioned, assigned to the client, and the client receives a first certificate representation. The method 400 also includes a second round trip communication phase 402 in which the client makes an initial connection request to the virtual machine, and the virtual machine responds with a second certificate representation. The method 400 includes an authentication decision phase 403 in which the client decides whether to authenticate the virtual machine depending on the certificate representations.

The method 400 begins with a request to provision a virtual machine for a client (act 411). For instance, in FIG. 2, the virtual machine 211A may be instantiated and provisioned to be assigned to the client 201. Although this act is illustrated in the left column of FIG. 4, this initial provisioning request need not be made by the client 201, but may be made by some third party such as, for example, an administrator that has the responsibility of provisioning virtual machines for an organization to which the user of the client 201 belongs. Nevertheless, the provisioning request may alternatively be made by the client 201.

Note that at this stage, the virtual machine 211A is not yet in existence, and even the identity of the host computing system on which the virtual machine is to be instantiated may not be predetermined (if there are multiple potential host candidates within the cloud computing environment for the virtual machine). For instance, in the cloud computing environment 300 of FIG. 3, the virtual machine provisioning request may be made to the control service 303, which decides which host 302 to instantiate the virtual machine. In this case, suppose that the control service 303 selected the host 302A as being the most suitable for executing the virtual machine. The provisioning request may then be passed on (perhaps directly, or perhaps with some alteration) to the host 302A. In the context of FIG. 2, the provisioning request is received by the host 210.

The host then causes the virtual machine to be instantiated from a virtual machine image (act 421), and further provisions the virtual machine. For instance, in FIG. 2, suppose that the host 210 instantiates virtual machine 211A for the client 201. In FIG. 3, suppose that the host 302A instantiates virtual machine 311A for the client using one of the virtual machine images 312 within the storage service 301.

As the virtual machine boots up, as part of the boot process, the virtual machine generates a certificate (act 431) (hereinafter also referred to as a "virtual machine certificate"), installs the certificate on the virtual machine (act 432), and provides a first certificate representation of the virtual machine certificate to the client (act 433). While this certificate representation could be a copy of the virtual machine certificate, it could also be a hash of the virtual machine certificate. However, a hash could make transfer and comparison of the virtual machine certificate easier. In one embodiment, the hash is a "thumbprint", which is the hash itself, used as an abbreviated form of the public key of a certificate.

In one embodiment, the generation of the virtual machine certificate (act 431), the installation of the virtual machine certificate (act 432) and the providing of a first certificate representation of the virtual machine certificate towards the client (act 433) may be performed by executing a provisioning agent on the virtual machine. Although not required, this provisioning agent may not be present within the virtual machine image from which the virtual machine is instantiated, and perhaps instead may have been acquired by the virtual machine during boot of the virtual machine. This case will be described further below with respect to FIG. 5.

Once the host receives the first certificate representation, the host provides the first certificate representation to the client (act 422). For instance, in FIG. 2, the host 210 may receive the first certificate representation of the certificate installed on the virtual machine 211A, and provide the first certificate representation to the client 201 over the cloud computing channel 202. In FIG. 3, the host 302A may receive the first certificate representation of the certificate installed on the virtual machine 311*a*, and provide the first certificate representation to the client via the control service 303. This completes the first round trip communication phase 401.

The client receives the first certificate representation from the virtual machine via the host (act 412). Thereafter, the client makes an initial virtual machine connection request and submits the request to the virtual machine (act 413). In one embodiment, this initial connection request is made using a protocol that causes the virtual machine to automatically return a second certificate representation of the virtual machine certificate towards the client. The second certificate representation could, for example, be hash or a copy of the virtual machine certificate. An example of such a conventional protocol is the Remote Desktop Protocol (RDP) protocol. However, the principles described herein are not limited to this RDP protocol, or even any existing protocol, as new protocols may be developed in the future which have this characteristic. The host then provides the initial connection request to the virtual machine (act 423).

The virtual machine then receives the initial connection request (act 434). Within this initial request may include client and/or user credentials that allow the user and/or client to authenticate to the virtual machine. Note however at this point that the virtual machine has not yet authenticated to the client in response to this initial connection request. To facilitate the client authenticating the virtual machine, the virtual machine responds to the initial connection request by sending a second certificate representation of the virtual machine certificate to the client (act 435). This second representation could again be any representation of the certificate such as, for example, a hash or a copy of the virtual machine certificate. If the RDP protocol is used, the virtual machine would typically return a copy of the virtual machine certificate.

The host then sends (or relays) the second certificate representation to the client (act 424). The client then receives the second certificate representation of the virtual machine certificate (act 414), thus completing the second round trip communication phase 402. As an example, in FIG. 2, this second round trip communication phase 402 occurs between the client 201 and the virtual machine 211A.

In FIG. 3, this second round trip communication phase 402 occurs between the client (not shown) and the virtual machine 311A. This allows the client to then perform the authentication decision phase 403.

In order for the client to decide whether to authenticate the virtual machine, the client compares the first certificate representation (returned to the client as a result of the first round trip communication phase 401) with the second certificate representation (returned to the client as a result of the second round trip communication phase 402) (act 415). For instance, if the first certificate representation were a hash of the virtual machine certificate, and the second certificate representation were a copy of the virtual machine certificate, the client would hash the second certificate representation and see if the same hash value was arrived at.

If there is not a match of the first and second certificate representations ("No" in decision block 416), then the client does not authenticate the virtual machine (act 417), and thus cannot trust that the party with whom the client is communicating is truly the virtual machine assigned to the client. If, on the other hand, there is a match of the first and second certificate representations ("Yes" in decision block 416), then the client authenticates the virtual machine (act 418), and thus can trust that the party with whom the client is communicating is truly the virtual machine assigned to the client, and can thus operate with confidence with the virtual machine.

As previously mentioned, the virtual machine may perform the generation, and installation of the virtual machine certificate, and the providing of the first certificate representation to the client using a provisioning agent. This provisioning agent may also assist in other functions such as the reporting to the user regarding a status of the provisioning process. More regarding this will now be described with respect to FIGS. 5 and 6.

Figure 5:
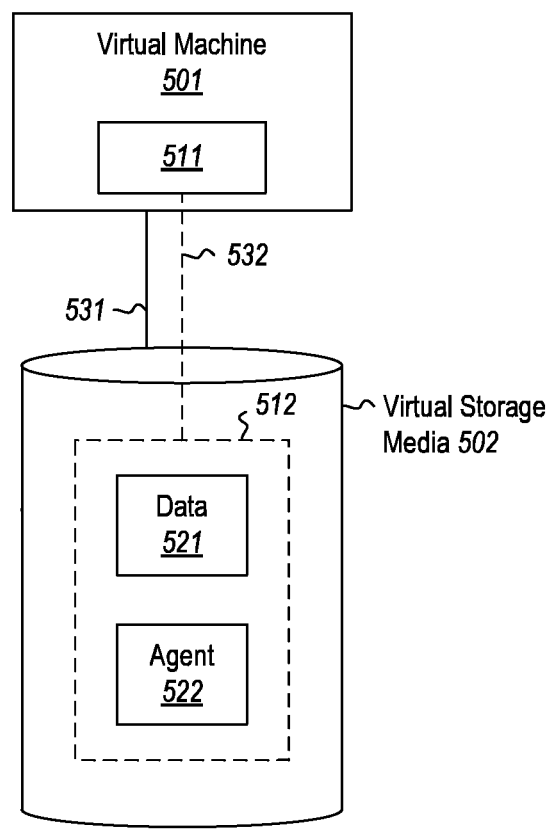
FIG. 5 illustrates an environment in which a virtual machine may be instantiated, provisioned, and operated.

FIG. 5 illustrates an environment 500 in which a virtual machine 501 may be instantiated, provisioned, and operated. The environment 500 represents an example of the host computing system 302A of FIG. 3, and the virtual machine 501 is an example of the virtual machine 211A of FIG. 2, and virtual machine 311A of FIG. 3. The environment 500 also includes virtual storage media 502 to which the virtual machine 501 may be connected so as to access data on the virtual storage media 502. The virtual storage media include boot computer-executable instructions 511 that are executed at boot time of the virtual machine 511.

The virtual storage media 502 includes content 512 that is made accessible to the virtual machine 501 in response to execution of the boot computer-executable instructions 511. The execution of the boot computer-executable instructions 511 also allows the virtual machine 501 to access content 512 of the virtual storage media 502 such as provisioning data 521 and a provisioning agent 522.

The provisioning data 521 includes data that may be used by the virtual machine to populate user-specific and machine-specific information within the virtual machine 501 so as to specialize the virtual machine 501 towards a particular user or machine. Thus, even though the virtual machine 501 is booted from a generalized virtual machine image, the virtual machine 501 ends up being specialized to a particular user and machine. Thus, the provisioning data 521 helps to provision the virtual machine 501. In one embodiment, the provisioning data may be an answer file, that is used by the virtual machine during the specialization phase of installation.

The provisioning agent 522 represents computer-executable code that may accessed (in response to executing the boot computer-executable instructions 511) and executed to perform tasks related to the provisioning of the virtual machine 501. For instance, the provisioning agent may monitor the progress of the provisioning process and/or report regarding the same, and may generate the virtual machine certificate (act 431), install the virtual machine certificate on itself (act 432), and dispatch the first certificate representation of the virtual machine certificate towards the client (act 433).

Figure 6:
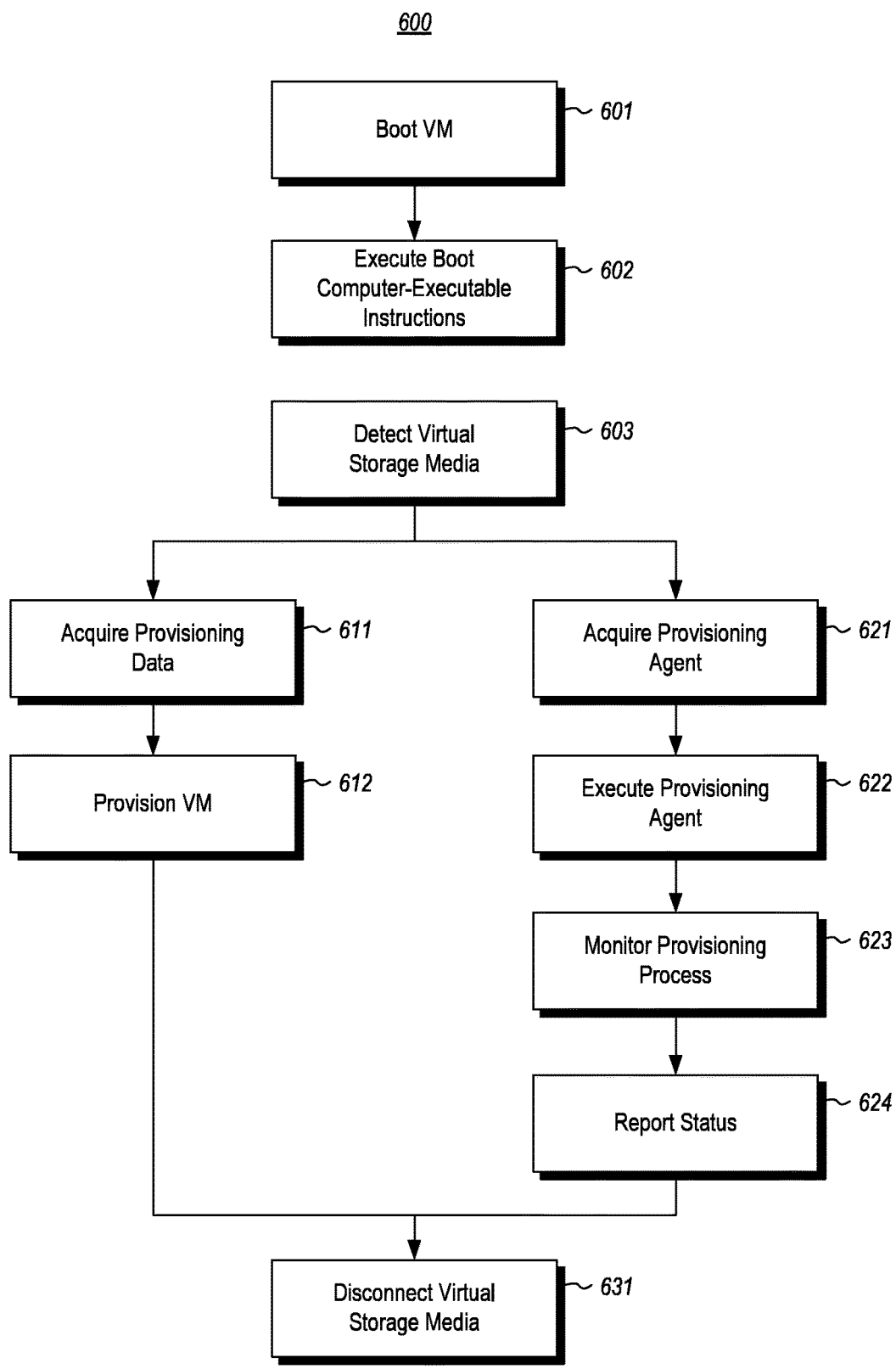
FIG. 6 illustrates a flowchart of a method 600 provisioning a virtual machine when booting the virtual machine from a generalized virtual machine image.

FIG. 6 illustrates a flowchart of a method 600 for provisioning a virtual machine when booting the virtual machine from a generalized virtual machine image. The method 600 is initiated upon initiating boot of the virtual machine (act 601). This involves creating virtual machine instance based on a generalized virtual machine image. Also, the virtual machine instance will be partially populated with parameters that are not specific to the user and/or machine that is to be assigned to the virtual machine.

In this state, the virtual machine contains boot executable-instructions. For instance, in FIG. 5, the virtual machine 501 includes boot computer-executable instructions 511. These boot computer-executable instructions are then executed (act 602).

The execution of the boot computer-executable instructions causes the virtual machine to detect virtual storage media that is accessible to the virtual machine (act 603). For instance, referring to FIG. 5, the virtual machine 501 executes the boot computer-executable instructions 511, causing the virtual machine 501 to detect and be able to access the virtual storage media 502, as represented by line 531. The virtual storage media is presented by a hypervisor which abstracts away underlying physical storage media. When a computing system boots up, one of the processes performed by some operating systems is to discover attached devices. It may be this process that discovers the virtual storage device. In some embodiments, this virtual storage media may be, for example, a virtual DVD drive.

Once the virtual machine detects the virtual storage device, the virtual machine has access to at least some of the content of the virtual storage device. For instance, in FIG. 5, the virtual machine 501 is capable of accessing the content 512 of the virtual storage media 502 through execution of the boot computer-executable instructions 511 as represented by the line 532. At this point, the virtual machine may acquire both the provisioning data (act 611) and the provisioning agent (act 621) from the virtual storage media. For instance, in FIG. 5, the virtual machine 501 acquires the provisioning data 521 and the provisioning agent 522 from the virtual storage media 502.

As an example, the provisioning data may be an answer file. Answer files are conventionally used to perform the specialization phase of operating system installation on a physical computing system. During installation of an operating system on a physical computing system, there are two phases; namely, a copying phase, and a specialization phase. During the copying phase, files are copied onto the physical computing system. During the specialization phase, the user is typically queried for user-specific or machine-specific information that will tailor the operating system for the physical computing system on which the operating system is being installed, and for the user of the physical computing system. However, it is conventionally known that instead of querying the user, the user and machine-specific information may instead be provided in an answer file that follows a particular schema. The installation process may instead review the answer file for answers to the relevant questions that would normally be posed to the user during installation.

The provisioning data may include, for example, parameters such as, but not limited to, machine name, user accounts, user account settings, group policies, access password, time zone.

The provisioning data is then used to provision the virtual machine (act 612). For instance, referring to FIG. 5, the execution of the boot computer-executable instructions may cause the virtual machine 501 to query the provisioning data 521 (e.g., an answer file) for user specific or machine specific settings, and appropriate set its own settings with the same, thereby creating a virtual machine that is provisioned to the specific machine and/or user that is assigned to use the virtual machine.

The virtual machine may also acquire the provisioning agent from the detected storage media (act 621). For instance, in FIG. 5, the virtual machine 501 acquires the provisioning agent 522 from the virtual storage media 502. This may be performed by the virtual machine 501 executing the boot computer-executable instructions 511.

The provisioning agent represents a collection of computer-executable instructions that may be executed by the virtual machine. The virtual machine then executes the provisioning agent (act 622). The virtual machine may also monitor progress of the virtual machine (act 623), and report status of the provisioning process to the client (act 624). For instance, in FIG. 5, the virtual machine 501 may execute the provisioning agent 522 in response to executing the boot computer-executable instructions 511. The boot computer-executable instructions 511 and the provisioning agent 522 may each be collectively or individually embodied on a computer-readable media, such as a computer storage media, as a component of a computer program product.

For instance, suppose that the virtual machine being provisioned were the virtual machine 311A of FIG. 3. The status of the provisioning of the virtual machine 311 may be reported to the host computing system 302A, and then to the control service 303, and then to the user. Examples of reported status include the success or failure of the provisioning process, or perhaps a timeout status of the provisioning process (e.g., whether or not the provisioning has taken longer than a specified timeout period). Examples of control services 303 include services that support cloud computing systems such as, for example, MICROSOFT AZURE.

The provisioning agent 522 might also perform the generation of the virtual machine certificate (act 431), the installation of the virtual machine certificate on the virtual machine (act 432), and the providing of a first certificate representation towards the client (act 433).

After the provisioning is completed, or at least after the provisioning data and the provisioning agent is acquired from the virtual storage device, the virtual storage device may be disconnected from the virtual machine (act 631), if the virtual storage device is not to be used for normal operation by the virtual machine.

In one embodiment, the operating system (hereinafter referred to as a "boot enabled operating system") of the virtual machine may be of a type that has boot-time computer-executable instructions 511 that are executed automatically during boot time to cause the virtual machine to acquire and user the provisioning data to provision the virtual machine, and to acquire and execute the provisioning agent. An example of such a computing system is MICROSOFT WINDOWS.

In one embodiment, the operating system (hereinafter referred to as a "non-boot enabled operating system") of the virtual machine may be of a type that does not have such boot-time computer-executable instructions 511. An example of such an operating system is LINUX. In this case, when the generalized virtual machine image is generated that includes such an operating system, the boot-time computer-executable instructions 511 are added to the generalized virtual machine image, so that they are present within at executed by the virtual machine at boot time.

Thus, the principles described herein describe a mechanism for a client to provision and initially connect to a virtual machine in a manner that the client can authenticate the virtual machine when initially connecting. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processor; and
   one or more storage device having stored computer-executable instructions which are executable by the one or more processors to provision a virtual machine when booting the virtual machine from a generalized virtual machine image by at least causing the computing system to perform the following:
      initiate a boot of a virtual machine from a generalized virtual machine image;
      detect virtual storage media accessible to the virtual machine;
      access content on the virtual storage media, the content including provisioning data and a provisioning agent;
      provision the virtual machine with the provisioning data;
      execute the provisioning agent to at least generate a virtual machine certificate;
      install the virtual machine certificate on the provisioning agent;
      monitor provisioning of the virtual machine;
      report provisioning status of the virtual machine to a client system requesting the virtual machine;
      provide a representation of the virtual machine certificate installed on the provisioning agent to the client which causes the client system to compare the provided representation of the virtual machine certificate installed on the provisioning agent to a representation of the virtual machine certificate previously provided to the client system, wherein if the representations of the virtual machine certificate match, the virtual machine is authenticated to the client system, and if the representations of the virtual machine certificate do not match, the virtual machine is disconnected from the client.

2. The computing system of claim 1, wherein initiating the boot of the virtual machine includes:
   creating a virtual machine instance based on the generalized virtual machine image and that is partially populated with parameters that are unspecific to a user and/or machine associated with the virtual machine.

3. The computing system of claim 1, wherein executing the provisioning agent includes:
   installing the virtual machine certificate on the virtual machine; and
   providing a representation of the virtual machine certificate to the client.

4. The computing system of claim 1, wherein the provisioning status includes at least one of a time out status and an indication as to whether the provisioning of the virtual machine exceeded an expected provisioning time.

5. The computing system of claim 1, wherein the provisioning data includes an answer file.

6. The computing system of claim 1, wherein the virtual storage comprises at least one of a hypervisor and a virtual DVD device.

7. A method implemented by a computing system for provisioning a virtual machine when booting the virtual machine from a generalized virtual machine image, the method comprising:
   initiating a boot of a virtual machine from a generalized virtual machine image;
   detecting virtual storage media accessible to the virtual machine;
   accessing content on the virtual storage media, the content including provisioning data and a provisioning agent;
   provisioning the virtual machine with the provisioning data;
   executing the provisioning agent to at least generate a virtual machine certificate;
   installing the virtual machine certificate on the provisioning agent;
   monitoring provisioning of the virtual machine;
   reporting provisioning status of the virtual machine to a client system requesting the virtual machine; and
   providing a representation of the virtual machine certificate installed on the provisioning agent to the client system which causes comparing, at the client system, the provided representation of the virtual machine certificate to a representation of the virtual machine certificate previously provided to the client system, wherein if the representations of the virtual machine certificate match, the virtual machine is authenticated to the client system, and if the representations of the virtual machine certificate do not match, the virtual machine is disconnected from the client system.

8. The method of claim 7, wherein initiating the boot of the virtual machine includes:
   creating the virtual machine instance based on the generalized virtual machine image and that is partially populated with parameters that are unspecific to a user and/or machine associated with the virtual machine.

9. The method of claim 7, wherein executing the provisioning agent further includes:
   installing the virtual machine certificate on the virtual machine; and
   providing a representation of the virtual machine certificate to the client.

10. The method of claim 7, wherein the method further includes disconnecting the virtual machine storage media from the virtual machine after the virtual machine is provisioned and based on the virtual machine being configured to not use the virtual storage media after authentication to the client system.

11. The method of claim 7, wherein the provisioning status includes at least one of a time out status and an indication as to whether the provisioning of the virtual machine exceeded an expected provisioning time.

12. The method of claim 7, wherein the provisioning data includes an answer file.

13. The method of claim 7, wherein the virtual storage comprises at least a virtual DVD device.

14. One or more hardware storage device having stored computer-executable instructions which are executable by one or more processors of a computing system to provision a virtual machine when booting the virtual machine from a generalized virtual machine image and to cause the computing system to perform the following:
- initiate a boot of a virtual machine from a generalized virtual machine image;
- detect virtual storage media accessible to the virtual machine instance;
- access content on the virtual storage media, the content including provisioning data and a provisioning agent;
- provision the virtual machine with the provisioning data;
- execute the provisioning agent to at least generate a virtual machine certificate;
- install the virtual machine certificate on the provisioning agent;
- monitor provisioning of the virtual machine; and
- report provisioning status of the virtual machine to a client system requesting the virtual machine; and
- provide a representation of the virtual machine certificate installed on the provisioning agent to the client which causes the client system to compare the provided representation of the virtual machine certificate to a representation of the virtual machine certificate previously provided to the client system, wherein if the representations of the virtual machine certificate match, the virtual machine is authenticated to the client system, and if the representations of the virtual machine certificate do not match, the virtual machine is disconnected from the client system.

15. The one or more hardware storage device of claim 14, wherein initiating the boot of the virtual machine includes:
creating a virtual machine instance based on the generalized virtual machine image and that is partially populated with parameters that are unspecific to a user and/or machine associated with the virtual machine.

16. The one or more hardware storage device of claim 14, wherein executing the provisioning agent further includes:
installing the virtual machine certificate on the virtual machine; and
providing a representation of the virtual machine certificate to the client.

17. The one or more hardware storage device of claim 14, wherein the virtual storage media is not to be used for normal operation by the virtual machine, and at least based on the virtual machine authenticating to the client system, disconnecting the virtual machine storage media from the virtual machine after the virtual machine is provisioned.

18. The one or more hardware storage device of claim 13, wherein the provisioning status includes at least one of a time out status and an indication as to whether the provisioning of the virtual machine exceeded an expected provisioning time.

19. The one or more hardware storage device of claim 13, wherein the provisioning data includes an answer file.

20. The computing system of claim 1, wherein the virtual storage media is not usable by the virtual machine subsequent to the virtual machine being authenticated to the client system such that, based at least on the virtual machine being authenticated to the client system, the virtual storage media is disconnected from the virtual machine.

* * * * *